Figure 1:
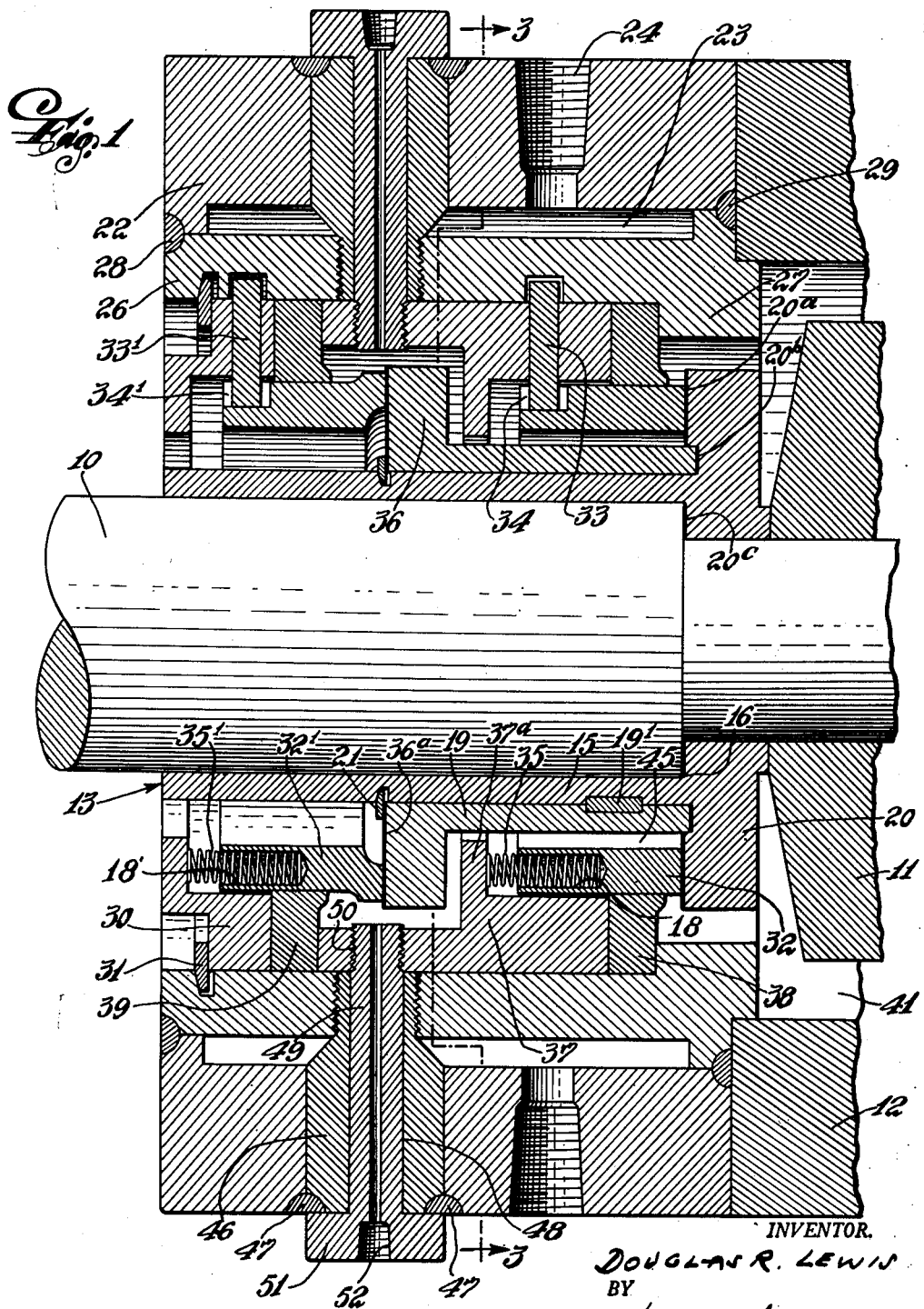

Sept. 30, 1952 D. R. LEWIS 2,612,390
SEALING UNIT
Filed July 9, 1949 2 SHEETS—SHEET 1

INVENTOR.
DOUGLAS R. LEWIS
BY
ATTORNEY

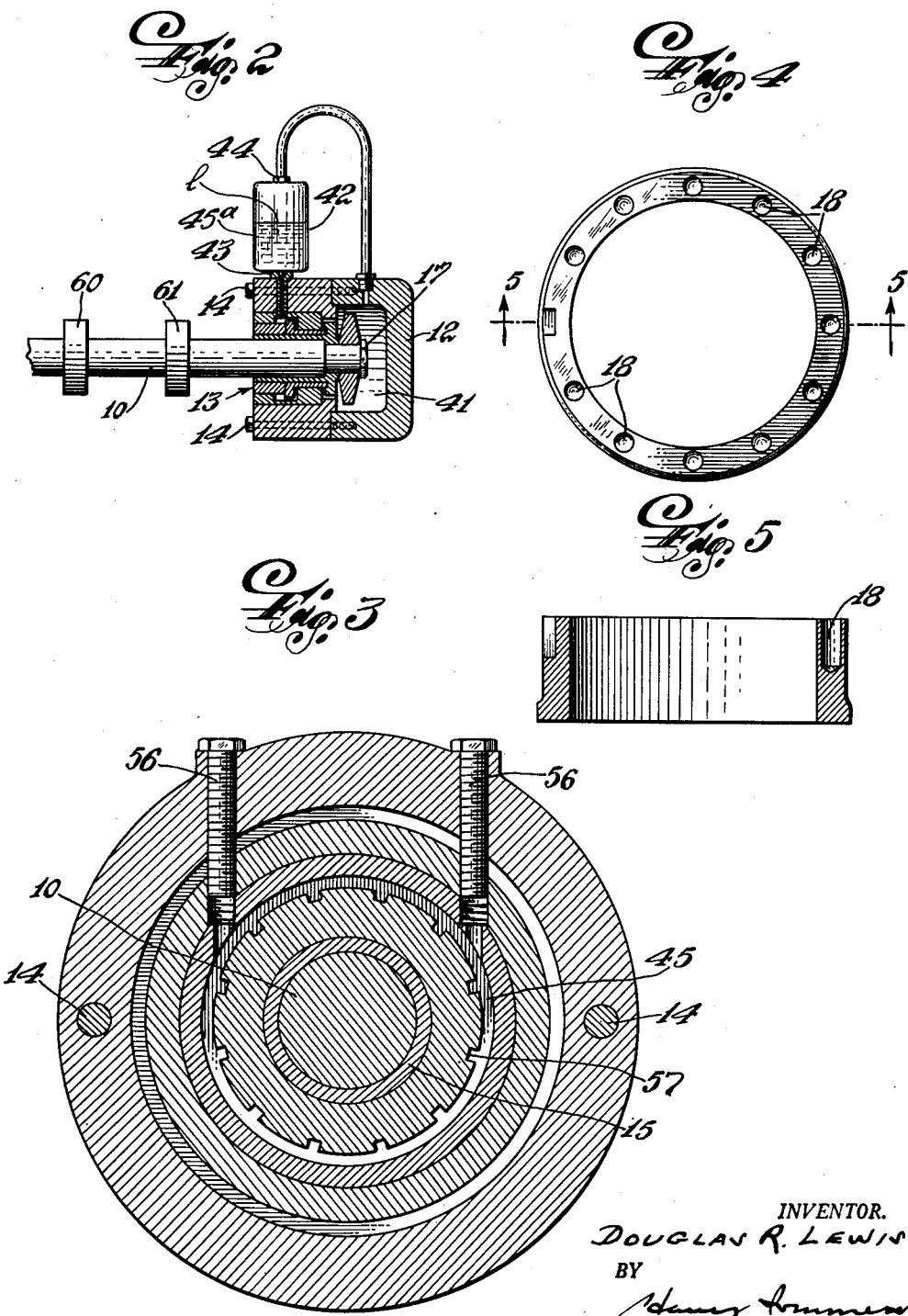

Patented Sept. 30, 1952

2,612,390

UNITED STATES PATENT OFFICE 2,612,390

SEALING UNIT

Douglas R. Lewis, Summit, N. J., assignor, by mesne assignments, to The Viscoseal Corporation, Union, N. J., a corporation of New Jersey Application July 9, 1949, Serial No. 103,837

4 Claims. (Cl. 286—9)

This invention relates to improvements in sealing units adapted for sealing a rotating shaft in a pressure vessel or other object. The structure of the invention, as will be apparent from the description hereinafter, is adapted for use with equal efficacy in connection with other industrial and laboratory applications. The invention may utilize a sealing medium to provide a viscous cork seal of a pressure equal to that of the medium to be sealed so that there will be no appreciable pressure drop between the sealing chamber and the pressure chamber to be sealed. The structure of the invention is further adapted to have incorporated therein temperature control features, hereinafter more particularly described.

These and other advantageous objects, which will appear from the drawings, and from the description hereinafter, are accomplished by my invention, of which embodiments are illustrated in the drawings. It will be apparent, from a consideration of said drawings, and the following description, that the invention may be embodied in other forms suggested thereby; such other forms as come within the scope of the appended claims are to be considered within the scope and purview of the instant invention.

In the drawings:

Fig. 1 is a medial vertical sectional view of a sealing unit embodying the invention, shown applied to a shaft indicated fragmentarily, Fig. 2 is a schematic view, on a reduced scale, illustrating a form of the invention which may be used to automatically replenish any lost sealing medium, Fig. 3 is a sectional view of a modified form of the invention, taken through line 3—3 of Fig. 1, modified as set forth hereinafter, Fig. 4 is a top plan view of a stator ring embodying the invention, and Fig. 5 is a vertical sectional view thereof, taken on line 5—5 of Fig. 4.

As shown in the drawings, the sealing unit 13 of the invention is adapted to be used in connection with a shaft 10 which may be of any outline, that shown in Fig. 1 having an impeller 11 or other member to be rotated by the shaft secured thereto by suitable means (for example, as shown at 17, Fig. 2). The pressure vessel or other object in which the shaft is to be sealed is indicated at 12. In this specification and the appended claims, the term "pressure vessel" shall be deemed to include any object in which a shaft or similar member having movement relative thereto is adapted to be sealed. The sealing unit 13 of the invention may be secured to said pressure vessel 12, as shown in Fig. 2, by bolts 14 or the like. As a matter of convenience in adapting the unit 13 to the shaft, a sleeve 15 may be secured to the shaft, said sleeve being provided with a shoulder 16 complementary to the shouldered portion of the shaft 10.

A rotor 19 is keyed to the sleeve 15 as at 19', between the outer head 20 of the sleeve 15 and the snap ring 21 positioned in a recess in the sleeve. The shaft 10, sleeve 15, snap ring 21 and rotor 19 rotate in unison. Aside from a consideration of practical manufacturing and assembly expedients, the rotor 19 might be made integral with the sleeve 15. The sleeve 15 and rotor 19 are, in effect, a rotor unit having inner and outer heads 36 and 20.

The relatively fixed parts of the sealing unit are the outer shell 22 which, with the cylindrical portion 26 thereof, is provided with a temperature control groove 23, which may be supplied with a medium such as oil from a source (not shown) for heating and cooling purposes, coupled to the threaded apertures 24. The cylindrical portion 26 of the shell 22 is provided with a shouldered end 27. In practise, it is found convenient to manufacture the outer shell 22 and cylindrical portion 26 as separate parts welded together as at 28, 29. Cap 30 is positioned within the cylindrical portion 26 of the shell 22, and held in position by the snap ring 31; stator rings 32 and 32' are positioned within the cap 30 and spacer 37 respectively, the latter being positioned within the cylindrical portion 26 of the shell 22. The stator rings are provided with keyways 34, 34' to receive the keys 33, 33' to key the same to the cylindrical portion 26 of the shell 22, said keyways, as will be apparent from a consideration of the drawings, permitting limited movement of the stator rings. The keyways in the cylindrical portion 26 of shell 22 also permit limited movement. Thus, the parts may yield for limited movement in the axial plane of shaft 10 and at right angles thereto, while maintaining an effective seal at all times. Springs 35 in recesses 18 of the stator ring 32 engage the shoulder 37a of the spacer 37 to press the stator ring against the outer head 20 of the sleeve 15. Springs 35' in recesses 18' of the stator ring 32' engage cap 30 to press the stator ring 32' against the inner head 36 of the rotor 19. A gasket ring 38 is positioned between the spacer 37 and the shouldered end 27 of the cylindrical portion 26 of the shell 22, and bears on the stator ring 32. Gasket ring 39 is positioned between the cap 30 and the spacer 37 and the cylindrical portion 26 of the shell 22 and bears on the stator ring 32'. The key 33 keys the stator ring 32 (and the spacer) to the cylindrical portion 26 of the shell 22; key 33' keys the stator ring 32' (and the cap 30) to the cylindrical portion 26 of the shell 22. The outer head 20 of the sleeve 15 is provided with inner face 20a against which the stator ring 32 engages and inner face 20b against which the rotor engages and inner face 20c against which the shaft engages. These faces are preferably hard finished. Likewise, the face 36a of the inner head 36 of the rotor 19, which is engaged by the stator ring 32' is preferably hard finished. The rotor 19 and stator ring 32 and spacer 37 define a sealing chamber 45. There would be a pressure drop at the point indicated at 20a if there were any difference in pressure between that in the chamber 41 of the pressure vessel 12 and said sealing chamber 45 of the sealing unit 13. Pursuant to the instant invention, pressure drop may be obviated by filling the sealing chamber 45 with a sealing medium of a pressure equal to that in the pressure chamber 41. The sealing medium should be of suitable viscosity and cohesion (depending upon the nature of the medium to be sealed in the chamber 41) and should be immiscible with the medium to be sealed. This is a matter which may be determined readily by the user, depending on the specific applications of the invention.

Pursuant to the invention, an outer connection may be provided to the sealing chamber 45—for example, as shown in Fig. 1, by positioning a sealing plug 46 through an aperture in the outer shell 22, cylindrical portion 26 thereof, and spacer 37 communicating with the said sealing chamber 45. Said plug may be welded, as at 47, to the outer shell 22. As a matter of convenience, the specific form shown in Fig. 1 may be used wherein the spacer 37 may be provided with a threaded aperture 50 to receive a smaller plug 49, positioned within the opening 48 of the plug 46 and having a threaded bore 52 in its head 51 to facilitate connection thereof with a sealing medium source outside the sealing unit 13. The threaded bore 52 may be sealed when it is not desired to connect the sealing chamber 45 to the source. It will be apparent from a consideration of Fig. 1 and the above disclosure that other forms of connectors may be used for the purpose mentioned in connection with plugs 46, 49. Likewise, more than one plug unit may be provided. In Fig. 1, which represents a medial, vertical longitudinal sectional view, two such plugs are shown spaced 180° apart.

While I have found in practise that the seal embodying my invention is most practical in operation, some loss of sealing medium may occur in prolonged use. An arrangement such as shown in Fig. 2 may be used to automatically replenish sealing medium leaking from chamber 45. Fig. 2 is a reduced schematic view wherein certain structural features better shown in Fig. 1 are omitted or schematically shown. The arrangement shown in Fig. 2 comprises a reservoir 42, one end 43 of which is connected to the plug 49, the other end 44 being connected to the pressure chamber 41. The reservoir 42 may be made of a transparent material so that the level 1 of medium therein may be readily observed or may be provided with a gauge (not shown) for the purpose. The reservoir may be filled with a material 45a corresponding to that with which the sealing chamber 45 is filled, in any convenient manner. It will be apparent that if leakage occurs in the chamber 45, pressure in said chamber will be reduced so that it will be lower than that in the pressure chamber 41, which will result in pressure in reservoir 42 forcing the contents thereof into the sealing chamber 45 to the extent required to replenish the same. This arrangement provides for automatic compensation of losses through leakage and requires practically no attention by the operator. In the form shown in Fig. 2, the shaft 10 is shown positioned in bearings 60 and 61 which are suited to the specific pressure vessel arrangement shown in said figure. It will be apparent that the invention is adapted to be used with equal efficacy with shafts or other movable members disposed in other arrangements. The location and number of sealing units 13 used may be varied to meet operating requirements; thus, for example, where it has been customary to provide two sealing units at spaced points of the shaft, two sealing units 13 embodying the invention may be applied.

In Fig. 3, a modification is shown wherein, in place of the plugs 46 disposed generally radially of the sealing chamber 45 and 180° apart, plugs 56 of the same general sort and serving the same purpose, are disposed tangentially of the sealing chamber 45 and parallel to each other. In this modification, the inner head 36 of the rotor is provided with end notches or recesses 57. Thus a velocity is imparted to the sealing medium in the sealing chamber 45 when the shaft turns, and a pumping action is produced, the direction of the flow depending on the direction of rotation of the shaft.

It will be apparent from the foregoing that, in operation, the stator rings 32, 32" are movable to a limited degree and will thus compensate for such axial movements of the shaft as may occur in practise, due to play in thrust bearings, thermal changes in the shaft, or other operational factors. The parts adapt themselves to such changes while maintaining a constant and uniformly efficient sealing action. The gasket rings 38, 39, as will be apparent from a consideration of the drawings, also serve to maintain the parts sealed notwithstanding such relative movement as may occur in practise.

It will be apparent from a consideration of the drawings and the above description that the structure illustrated in the drawings and described above may be made in various forms to suit various specific use requirements, and that parts may be multiplied, united and altered within the purview and scope of the invention, as set forth in the appended claims.

For example, the cylindrical portion 26 of shell 22 need not necessarily be cylindrical, nor need other parts such as the stator rings, spacer, cap and rotor be cylindrical. The parts are shown cylindrical by way of example only.

Having thus described my invention, what I claim as new and desire to secure by Letters Patent is:

1. In a sealing unit for sealing a rotating shaft in an object, an outer shell adapted to be secured to said object, a cylindrical portion on said shell having a shouldered end, said shell and cylindrical portion having a temperature control groove and an aperture connected to said groove, rotor means adapted to be secured to said shaft and having upstanding inner and outer heads, a cap in said unit, spaced from the rotor, a spacer positioned in said shell, a stator ring positioned in the spacer, means engaging the stator ring and urging the same against the outer head of the rotor, a gasket between the spacer, stator and shouldered end of the shell, a stator ring positioned between the cap and inner head, means engaging the last mentioned stator ring and urging the same against the inner head, and a gasket between the last mentioned stator ring, cap, spacer and shell.

2. In a sealing unit for sealing a rotating shaft in an object, an outer shell adapted to be secured to said object, said shell having a shouldered end, a rotor adapted to be secured to said shaft, said rotor having upstanding inner and outer heads, a cap in said unit, spaced from the rotor, a stator ring, means engaging the stator ring and urging the same against the outer head of the rotor, a gasket between the stator and shouldered end of the shell, a stator ring positioned between the cap and inner head of the rotor, means engaging the last mentioned stator ring and urging the same against the inner head of the rotor, and a gasket between the last mentioned stator ring, cap and shell 3. In a sealing unit for sealing a rotating shaft in an object, an outer shell adapted to be secured to said object, a cylindrical portion on said shell having a shouldered end, said shell and cylindrical portion having a temperature control groove and an aperture connected to said groove, a rotor adapted to be secured to said shaft, said rotor having upstanding inner and outer heads, a cap in said unit, spaced from the rotor, a spacer positioned in said shell, spaced from the cap, a stator ring positioned in the spacer, means engaging the stator ring and urging the same against the outer head of the rotor, a gasket between the spacer, stator and shouldered end of the shell, a stator ring positioned between the cap and inner head of the rotor, means engaging the last mentioned stator ring and urging the same against the inner head of the rotor, a gasket between the last mentioned stator ring, cap, spacer and shell, said shell and cylindrical portion and spacer having apertures, and a plug positioned in said apertures to connect the interior of the sealing unit to a source of sealing medium.

4. In a sealing unit for sealing a rotating shaft in an object, an outer shell adapted to be secured to said object, a cap positioned in said shell at one end thereof, a rotor secured to said shaft, a stator ring, means engaging said stator ring and cap to hold the former against the rotor, said stator ring and shell having recessed keyways and said cap having a keyway aperture therein, and a key positioned in the keyway aperture of the cap with its ends disposed in the recessed keyways of the stator ring and shell connecting the stator ring and cap to the shell.

DOUGLAS R. LEWIS.

REFERENCES CITED

The following references are of record in the file of this patent:

UNITED STATES PATENTS

| Number | Name | Date |
| --- | --- | --- |
| 1,124,514 | Platt | Jan. 15, 1915 |
| 1,258,218 | Hicks | Mar. 3, 1918 |
| 1,978,239 | Wheeler | Oct. 23, 1934 |
| 2,077,881 | Gits | Apr. 20, 1937 |
| 2,156,719 | Berger | May 2, 1939 |
| 2,215,034 | Gorman | Sept. 17, 1940 |
| 2,233,599 | Gilbert | Mar. 4, 1941 |
| 2,461,710 | Voorhees | Feb. 15, 1949 |

FOREIGN PATENTS

| Number | Country | Date |
| --- | --- | --- |
| 274,040 | Great Britain | Mar. 1, 1928 |